US010100773B2

(12) United States Patent
Surnilla et al.

(10) Patent No.: US 10,100,773 B2
(45) Date of Patent: Oct. 16, 2018

(54) METHOD AND SYSTEM FOR DUAL FUEL ENGINE SYSTEM

(71) Applicant: Ford Global Technologies, LLC, Dearborn, MI (US)

(72) Inventors: Gopichandra Surnilla, West Bloomfield, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 14/296,193

(22) Filed: Jun. 4, 2014

(65) Prior Publication Data

US 2015/0354492 A1 Dec. 10, 2015

(51) Int. Cl.
*F02D 9/02* (2006.01)
*F02D 41/30* (2006.01)
*F02D 41/00* (2006.01)
*F02P 5/04* (2006.01)
*F02D 37/02* (2006.01)

(52) U.S. Cl.
CPC ......... *F02D 41/3094* (2013.01); *F02D 37/02* (2013.01); *F02D 41/0002* (2013.01); *F02D 41/0025* (2013.01); *F02P 5/045* (2013.01); *F02D 41/0027* (2013.01); *F02D 2200/0411* (2013.01); *F02D 2200/0602* (2013.01); *Y02T 10/42* (2013.01)

(58) Field of Classification Search
USPC .. 123/349, 406.47, 445, 399, 431, 575–579, 123/525, 299, 300, 304, 432, 308
See application file for complete search history.

(56) References Cited

U.S. PATENT DOCUMENTS

| 2,921,569 | A | * | 1/1960 | Gold | F02M 69/048 |
| | | | | | 123/339.29 |
| 6,595,187 | B1 | * | 7/2003 | Russell | F02B 75/04 |
| | | | | | 123/406.47 |
| 6,907,870 | B2 | | 6/2005 | zur Loye et al. | |
| 7,621,257 | B1 | * | 11/2009 | Leone | F02D 13/0215 |
| | | | | | 123/1 A |
| 8,276,549 | B2 | * | 10/2012 | Wu | F02B 33/34 |
| | | | | | 123/1 A |
| 8,387,591 | B2 | | 3/2013 | Surnilla et al. | |
| 2011/0132340 | A1 | * | 6/2011 | Soltis | F02D 41/0025 |
| | | | | | 123/703 |

(Continued)

OTHER PUBLICATIONS

Anonymous, "EONV Leak Detection Robustness to Fuel Slosh Method," IPCOM No. 000236164, Published Apr. 10, 2014, 2 pages.

(Continued)

*Primary Examiner* — Lindsay Low
*Assistant Examiner* — Ruben Picon-Feliciano
(74) *Attorney, Agent, or Firm* — Julia Voutyras; McCoy Russell LLP

(57) ABSTRACT

Methods and systems are provided for accurately estimating an engine volumetric efficiency in a multi-fuel engine system operating with different fuels and different injection systems. The volumetric efficiency is revised based on the fraction of each fuel in the total fuel injection amount as well as based on the injection type for each fuel. The volumetric efficiency estimate compensates for the partial pressure effect and charge cooling effect of each fuel as well as each injection type.

19 Claims, 3 Drawing Sheets

(56) References Cited

U.S. PATENT DOCUMENTS

2011/0184632 A1* 7/2011 Kang .................. F02D 41/0007
 701/109
2013/0213353 A1 8/2013 Rollinger et al.

OTHER PUBLICATIONS

Surnilla, Gopichandra et al., "Method and System for Engine Control," U.S. Appl. No. 13/854,835, filed Apr. 1, 2013, 50 pages.
Pursifull, Ross D. et al., "Method and System for Fuel Vapor Management," U.S. Appl. No. 14/252,665, filed Apr. 14, 2014, 50 pages.
Ulrey, Joseph N. et al., "Method and System for Vacuum Generation," U.S. Appl. No. 14/266,411, filed Apr. 30, 2014, 41 pages.

* cited by examiner

METHOD AND SYSTEM FOR DUAL FUEL ENGINE SYSTEM

FIELD

The present application relates to methods and systems for adjusting a volumetric efficiency estimate in a dual fuel system.

BACKGROUND AND SUMMARY

Engines may be configured with direct fuel injectors that inject fuel directly into a combustion cylinder (direct injection), and/or with port fuel injectors that inject fuel into a cylinder port (port fuel injection). Multi-fuel engine systems can use both port and direct injection with different fuel types provided to the different injectors. For example, direct injection of ethanol fuel may be used with port injection of gasoline fuel. Therein, the direct injection of the alcohol fuel may take advantage of the increased charge cooling effects of the alcohol fuel's higher heat of vaporization and increased octane. This helps to address knock limitations, especially under boosted conditions. Further, the port injection of the gasoline fuel may take advantage of the higher power output of the gasoline fuel.

As such, the composition of a fuel injected into an engine affects the volumetric fuel economy and efficiency of the engine. As recognized by Surnilla et al. in U.S. Pat. No. 8,387,591, the non-linear relationship between the volumetric composition of a direct injected fuel and the octane number of the fuel can make calculation of engine control adjustments complex. The inventors herein have recognized that in multi-fuel systems, such as a dual fuel system, a further degree of complexity is involved. This is because the volumetric efficiency of the engine depends on the net effect of the types of fuel injected into the engine, the amount of each fuel that is injected, as well as the injection system used to inject the fuel. In other words, the impact on volumetric efficiency when a gasoline fuel is port injected and an ethanol fuel is direct injected may be different from when the gasoline fuel is direct injected and the ethanol fuel is port injected. As such, if the volumetric efficiency of the engine is not adjusted to correct for these fuel effects, the amount of air in the cylinder may be estimated erroneously. This would, in turn, lead to errors in engine torque estimation, fuel system monitor errors, etc. In sum, engine performance would be degraded.

At least some of the above issues may be at least partly addressed by a method for accurately estimating engine volumetric efficiency when operating with a multi-fuel system. The method includes: adjusting an estimate of engine volumetric efficiency in response to fuel port injected and fuel direct injected into a cylinder during a cylinder cycle; and adjusting an actuator in response to the estimate of engine volumetric efficiency. In this way, cylinder aircharge estimation errors can be reduced.

As an example, an engine may be fueled with a first fuel (e.g., a primary fuel, such as gasoline) via port injection. The engine may also be fueled with a second, different fuel (e.g., a secondary fuel, such as ethanol) via direct injection. The engine volumetric efficiency of the dual fuel engine may be determined based on the injection amount of each of two fuels as well as their injection system. In particular, the volumetric efficiency estimate may be reduced as the port injection of the gasoline fuel increases while the volumetric efficiency estimate may be increased as the direct injection of the ethanol fuel increases. The overall volumetric efficiency of the engine is calculated as the net effect of the volumetric efficiency decrease due to port injection of the gasoline fuel fraction and the volumetric efficiency increase due to direct injection of the ethanol fuel fraction. As such, when fuel evaporates in the manifold or the cylinder (in the intake stroke), it contributes a pressure which is the partial pressure of the fuel. Therefore, the effect of the port injected gasoline fraction may be determined based on a partial pressure of the gasoline fuel in the intake port. The effect of the direct injected ethanol fuel may be likewise determined based on the partial pressure of the ethanol fuel in the cylinder. In particular, since the cooling effect of the direct injected ethanol fuel is achieved only during the intake stroke while the intake valve is open, the adjusting may be based on the partial pressure in the cylinder during an IVO event. In one example, a controller may determine an initial or base volumetric efficiency estimate based on engine operating conditions, such as engine speed-load conditions, and may further update the base estimate based on the fuel fractions of the different fuels and their injection types. Based on the updated volumetric efficiency estimate, a cylinder aircharge estimate may be corrected. One or more engine actuator adjustments may be accordingly made. For example, one or more of a throttle opening, cam timing, valve timing, spark timing, injected fuel quantity and EGR flow rate may be adjusted.

While the above example is depicted with reference to gasoline and ethanol liquid fuels, it will be appreciated that the fuel type and injection type based volumetric efficiency estimation model may be similarly applied to various other fuel and injection combinations. For example, the same model may be used to accurately adjust the volumetric efficiency in a multi-fuel engine system operating with liquid fuel and gaseous fuel, such as an engine system having port injected CNG and direct injected gasoline.

In this way, the net effect of cooling and partial pressure of each fuel and each fuel injection type of a multi-fuel engine system may be better learned and used to correct a volumetric efficiency estimate. By improving the accuracy of the volumetric efficiency estimate, cylinder aircharge estimation errors can be reduced. As such, this improves engine actuator control and reduces torque disturbances. In addition, errors in the estimation of one or more other engine operating parameters that are based on the air flow estimate are also reduced. By reducing air-fuel errors, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
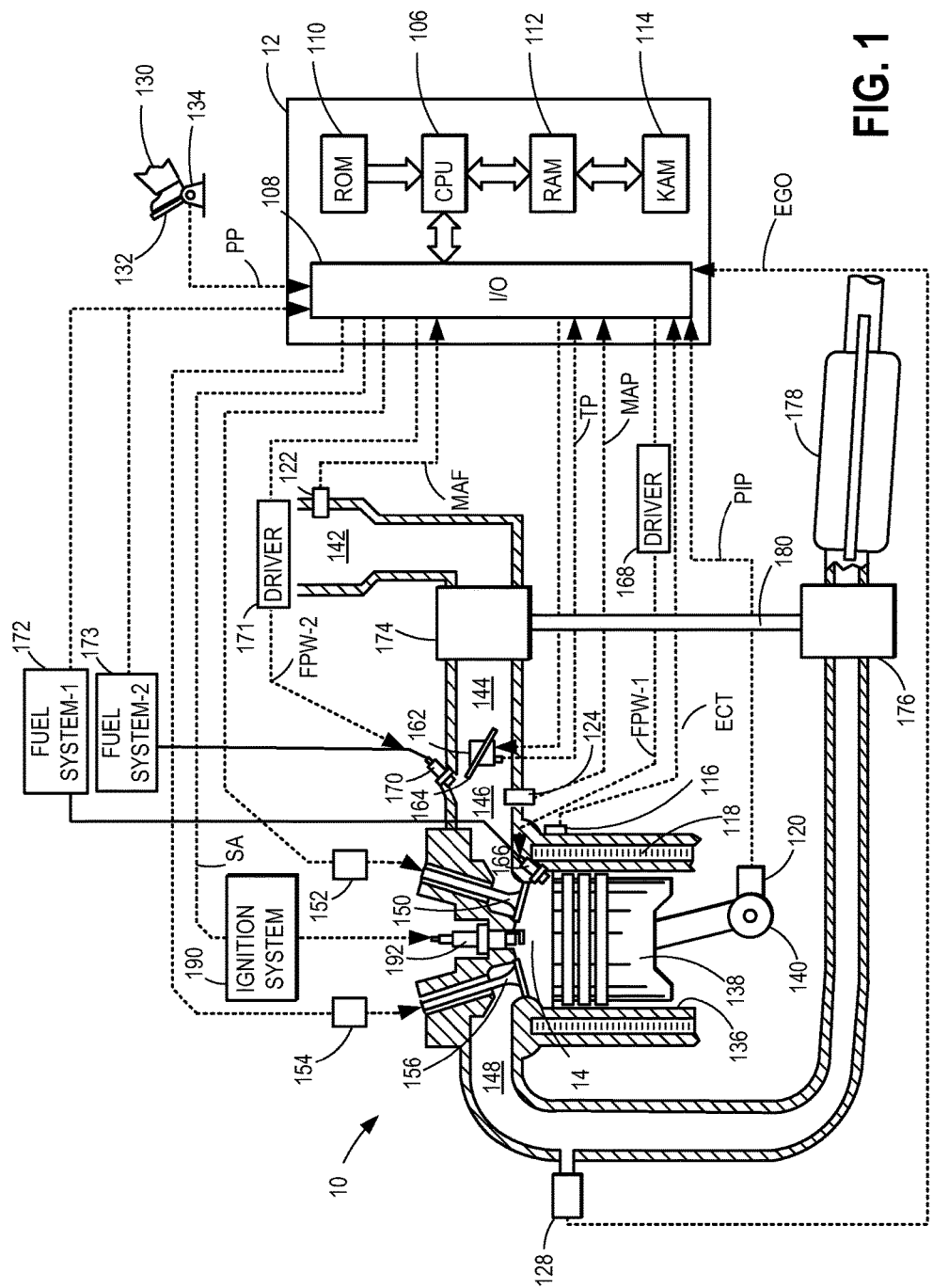
FIG. 1 shows an example combustion chamber for a multi-fuel engine.

The following description relates to systems and methods for improving the accuracy of volumetric efficiency estimation in a multi-fuel engine system, such as in the engine system of FIG. 1. An engine controller may perform a control routine, such as the routine of FIG. 2, to estimate the volumetric efficiency of the engine based on the fuel fraction of each fuel of the multi-fuel engine system, as well as the injection type used for the delivery of each fuel. Based on the revised volumetric efficiency estimate, the settings of one or more engine actuators may be adjusted to improve engine performance. Example adjustments are shown at FIG. 3.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the low volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems 172 and 173 may hold fuel with different fuel qualities, such as different fuel compositions. These differences may include different alcohol content, different octane, different heats of vaporization, different fuel blends, different fuel volatilities, and/or combinations thereof etc. One example of fuels with different alcohol contents could include gasoline as a first fuel with a lower alcohol content and an ethanol fuel blend (such as E85) as a second fuel with a greater alcohol content. In another example, the engine may use ethanol fuel blends of varying alcohol content as the first and second fuel, such as E10 (which is approximately 10% ethanol and 90% gasoline) as the first fuel that is port injected and E85 (which is approximately 85% ethanol and 15% gasoline) as a second fuel that is direct injected. Other feasible substances include water, a mixture of alcohol and water, a mixture of alcohols etc. As another example, fuels with different volatility could include fuel of different alcohol content, or fuels of different seasonal or regional grades (e.g., a winter grade fuel and a summer grade fuel, or a northern grade fuel and a southern grade fuel). Additionally, the first and second fuels may also differ in other fuel qualities such as a difference in temperature, viscosity, octane number, etc.

In still other examples, the fuel stored in each fuel tank may be the same the fuel delivered to the cylinder via the port injector and the direct injector may be a common fuel.

In the depicted embodiment, engine 10 is a multi-fuel engine system such that the fuel stored in fuel system-1 172 and delivered by fuel injector 166 is different from the fuel stored in fuel system-2 173 and delivered by fuel injector 170. As a non-limiting example, the first fuel delivered by port injection may be a first fuel having a lower alcohol content, while the second fuel delivered by direct injection may be a second fuel having a higher alcohol content. As elaborated below, the engine controller may adjust fuel injection profiles during an engine start, crank, and idle speed control to leverage the fuel properties of the different fuels available in the fuel system, as well as the benefits of port and direct injection to reduce exhaust gaseous and PM emissions.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine speed, load, exhaust temperature, PM emissions, etc. The relative distribution of the total amount of first fuel port injected by injector 170 and the total amount of second fuel direct injected (as one or more injections) by direct injector 166 may be referred to as an injection ratio. For example, injecting a larger amount of the first fuel for a combustion event via (port) injector 170 may be an example of a higher first ratio of port to direct injection, while injecting a larger amount of the second fuel for a combustion event via (direct) injector 166 may be a lower first ratio of port to direct injection. Note that these are merely examples of different injection ratios, and various other injection ratios may be used.

Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the intake stroke, multiple injections during the compression stroke, or a combination of some direct injections during the intake stroke and some during the compression stroke. When multiple direct injections are performed, the relative distribution of the total amount of second fuel directed injected between an intake stroke (direct) injection and a compression stroke (direct) injection may be referred to as a split ratio. For example, direct injecting a larger amount of the second fuel for a combustion event during an intake stroke may be an example of a higher split ratio of intake stroke direct injection, while injecting a larger amount of the second fuel for a combustion event during a compression stroke may be an example of a lower split ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the intake stroke, compression stroke, or any appropriate combination thereof.

Figure 2:
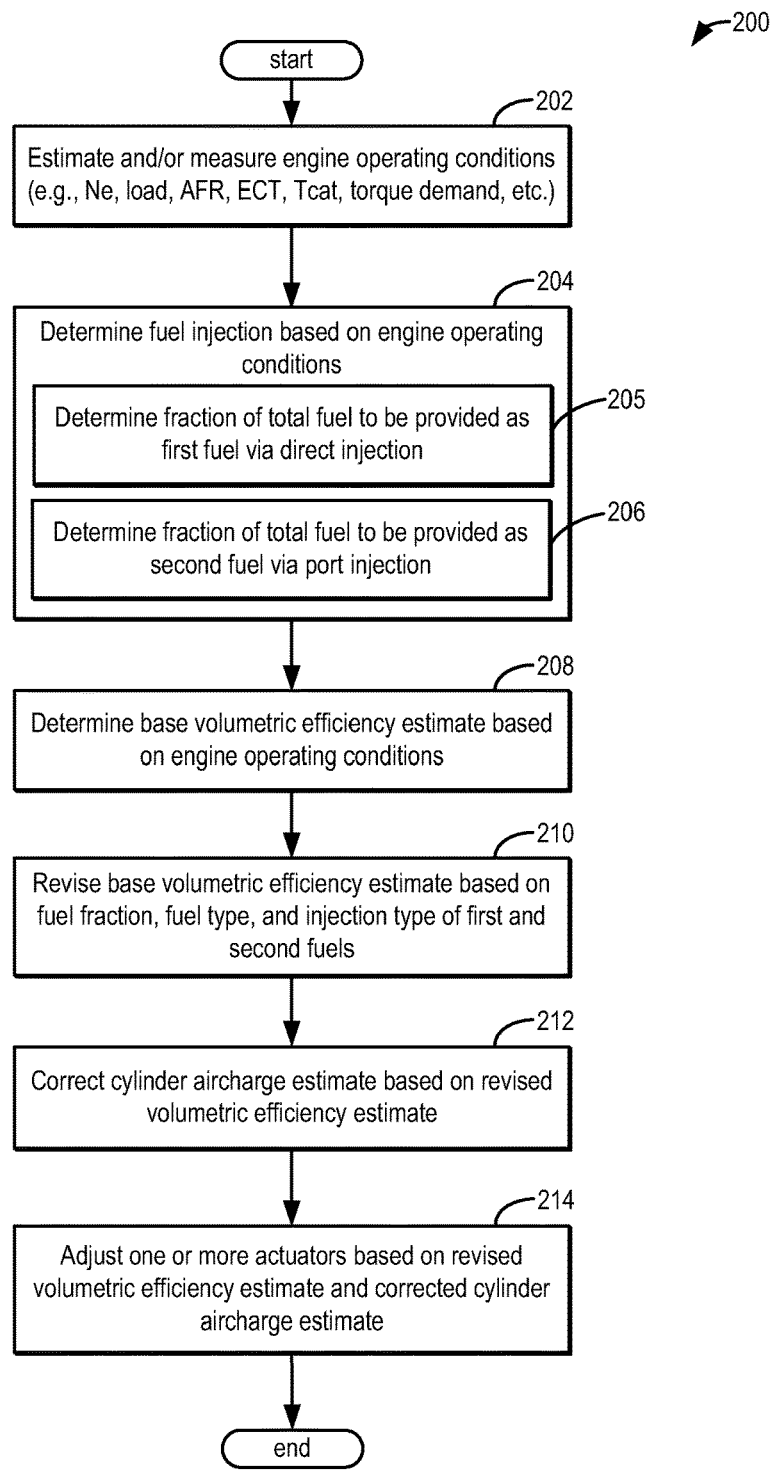
FIG. 2 shows a high level flow chart for adjusting a volumetric efficiency estimate in a multi-fuel system based on the fuels direct injected and port injected.
Figure 3:
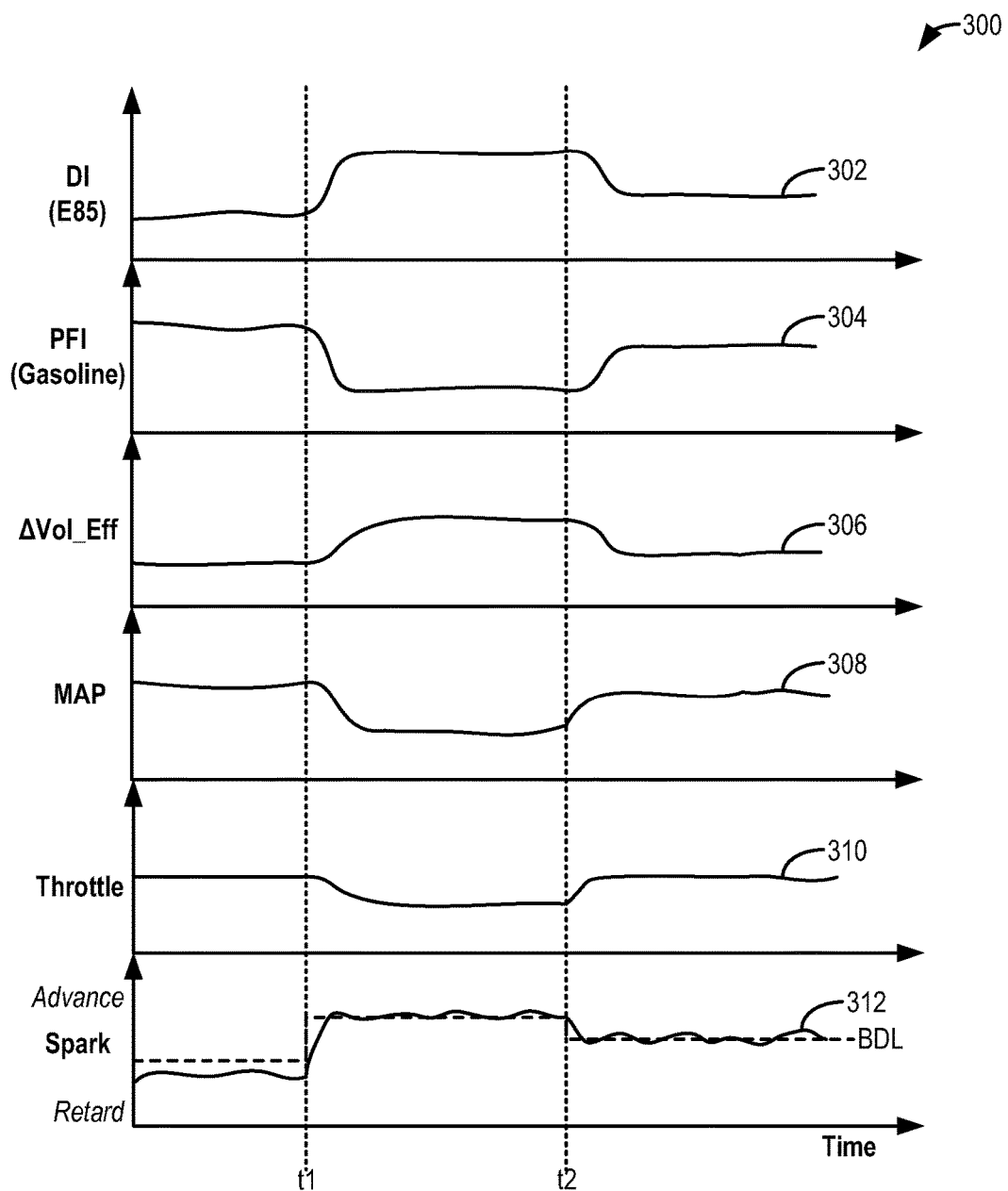
FIG. 3 show an example actuator adjustment based on the adjusted volumetric efficiency estimate, according to the present disclosure.

As elaborated with reference to FIG. 2, a controller may adjust an estimate of engine volumetric efficiency in response to fuel port injected and fuel direct injected into a cylinder during a cylinder cycle, and then adjust an actuator in response to the estimate of engine volumetric efficiency. For example, the controller may adjust the volumetric efficiency estimate taking into account that port fuel injection of a primary fuel, such as gasoline, reduces the volumetric efficiency of the engine while direct intake injection of a secondary fuel, such as ethanol, increases volumetric efficiency. Thus the overall volumetric efficiency of the engine is determined as the net effect of the volumetric efficiency decrease due to port injection of gasoline and the increase due to direct injection of ethanol.

As described above, FIG. 1 shows only one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 2.

FIG. 2 shows an example routine 200 for adjusting an engine volumetric efficiency estimate based on fuel injection to an engine cylinder. In particular, the volumetric efficiency estimate may be revised from an initial estimate based on engine speed-load conditions to compensate for the effect of different fuels and fuel injection types.

At 202, engine operating conditions may be estimated and/or measured. These may include, for example, engine speed, engine load, engine temperature, operator torque demand, catalyst temperature, fuel level in each fuel tank, fuels available, etc. At 204, a fuel injection amount may be determined based on the estimated engine operating conditions. Determining the fuel injection amount includes determining a fraction of total fuel to be provided as the first fuel via direct injection at 205. In addition, a fraction of total fuel to be provided as the second fuel via port injection may be determined at 206. The first fuel may be different from the second fuel and may have a different composition, state of matter, different octane rating, etc. In one example, the first fuel that is direct injected includes a liquid alcohol based fuel such as E85 while the second fuel that is port injected includes a liquid gasoline fuel. In another example, each of the first and second fuels may be liquid alcohol fuels of differing ethanol content, such as E10 (delivered via port injection) and E85 (delivered via direct injection). In still another example, the first fuel is a liquid fuel such as gasoline while the second fuel is a gaseous fuel such as CNG. In yet another example, the first fuel that is direct injected may have a lower alcohol content or octane rating than the second fuel. Further still, in some examples, a common fuel may be delivered via each of the direct and port injectors. In this case, determining the fuel injection amount includes determining a fuel fraction of the given fuel to be delivered via direct injection and a remaining fuel fraction to be delivered via port injection.

In addition to determining the amount of fuel to be delivered via port and direct injection, an injection timing may also be determined. In the case of the direct injected fuel, it may be determined as to whether the fuel is to be delivered as a single or multiple intake stroke injection(s), as a single or multiple compression stroke injection, or at least one intake stroke injection and at least one compression stroke injection. Likewise, in the case of the port injected fuel, it may be determined as to whether the fuel is to be delivered as a close valve event (e.g., during an exhaust stroke) or as an open valve event (e.g., during an intake stroke).

At 208, a base volumetric efficiency estimate may be determined based on the estimated engine operating conditions. For example, a base volumetric efficiency estimate may be determined based on engine speed, variable cam timing settings, intake manifold temperature, intake manifold pressure, turbocharger wastegate setting, exhaust backpressure, charge motion control device setting, and intake tuning device settings.

At 210, the base volumetric efficiency estimate may be adjusted based on fuel port injected and fuel direct injected into a cylinder during a cylinder cycle (e.g., in the next cylinder to fire). As such, since the volumetric efficiency is affected by the partial pressure of the evaporated fuel, as explained below, the adjusting based on fuel port injected may include adjusting in response to a partial pressure of fuel that is port injected. Likewise, the adjusting based on fuel direct injected may include adjusting in response to a partial pressure of fuel that is direct injected.

For example, a revised volumetric efficiency may be calculated as per the equation:

$$Vol\_eff = 1.0 + (1-di\_frac)*pfi\_fuel\_vol\_eff\_pp + di\_frac*di\_fuel\_vol\_eff\_pp + di\_frac*di\_fuel\_vol\_eff\_cool,$$

where di_frac is the fraction of the total fuel injected through the direct injection system and where Pfi_fuel_vol_eff_pp is the volumetric efficiency change due to the "partial pressure" of port injection of the primary fuel (e.g., gasoline), if all the fuel injected were by port injection. Since in port injection, the partial pressure contribution effect of fuel reduces the volumetric efficiency, the value of pfi_fuel_vol_eff is negative.

The effect on volumetric efficiency of the port injection may be further adjusted based on whether the port injection of fuel was performed on an open intake valve event or a closed intake valve event. As such, the volumetric efficiency increases with open intake valve port injection of fuel. In other words, the reduction in volumetric efficiency may be lower when fuel is port injected on an open intake valve (e.g., in the intake stroke) as compared to a closed intake valve (e.g., in the exhaust stroke).

Di_fuel_vol_eff_pp is the volumetric efficiency change due to the partial pressure effect of direct injection of the secondary fuel (e.g., ethanol), if 100% of the fuel injected were as a direct intake stroke injection (as compared to a compression stroke injection). As such, the partial pressure effect is active only on the intake injection part of the DI injection. Thus, adjusting in response to a partial pressure of fuel direct injected includes adjusting in response to a partial pressure of the portion of fuel that is direct injected during an intake stroke, and specifically, during intake valve opening (IVO). The compression injection portion of the fuel does not affect the volumetric efficiency of the engine as the engine intake valve is closed under such conditions. Di_fuel_vol_eff_cool is calculated as the change in the volumetric efficiency of the engine with direct injection of the secondary fuel, if 100% of the fuel is delivered as a direct intake injection.

As such, the volumetric efficiency of a given fuel injection depends on the injection system. With port injection of fuel, the volumetric efficiency is affected by the partial pressure of the evaporated fuel in the manifold. The evaporated fuel does not contribute to the cooling of aircharge as most of the heat for vaporization of the fuel is drawn from the valve at nominal injections. Some aircharge cooling effect is possible at very large fuel injections where some of the fuel takes the heat away from the aircharge, reducing the aircharge temperature. However, for all practical purposes, the cooling effect of a port injection is assumed to be zero.

In comparison, with direct injection, there are two competing effects that determine the volumetric efficiency gain or loss. The first is the partial pressure effect due to the pressure of the evaporated fuel when the intake valve is open. In this case, the fuel evaporated during an intake stroke direct injection increases the pressure and makes the condition akin to operating at a higher manifold pressure. Due to this increased pressure, the amount of aircharge that can be accommodated in the cylinder will be reduced. This leads to lowered volumetric efficiency. The amount of reduction in the volumetric efficiency will depend on the molecular weight of the fuel that is direct injected, the density of the fuel and the quantity of fuel injected via the direct injector.

The second effect competing with the first effect is the cooling effect due to evaporation of the direct injected fuel in the aircharge. The cooling of the aircharge increases the density of air leading to an increase in volumetric efficiency. The increase in volumetric efficiency is a function of amount of charge temperature reduction. The charge temperature reduction is, in turn, a function of the heat of vaporization of the fuel.

In one example, gasoline is delivered via port injection and E85 is delivered via direct injection. As such, when the fuel evaporates in the manifold or in the cylinder (during an intake stroke), it contributes a pressure which is the partial pressure of the fuel. Due to the lower molecular weight of ethanol (MW=46) relative to that of gasoline (MW=105), ethanol contributes more to partial pressure than gasoline. Due to the lower nominal air-fuel ratio for E85 (nominal AFR=9.8) relative to that of gasoline (nominal AFR=14.6), more mass of ethanol would be injected for stoichiometric fueling. Thus, ethanol will contribute more towards partial pressure. Overall, the net effect of partial pressure on volumetric efficiency is that Ethanol (E85) will lower the volumetric efficiency compared to gasoline. Likewise, port injected ethanol has a lower volumetric efficiency than a port injected gasoline engine.

Now an analysis of the charge cooling effects of the E85 fuel relative to gasoline is discussed in the comparative analysis of volumetric efficiency of gasoline and ethanol. The heat of vaporization of gasoline is about 150 Btu/lb while the heat of vaporization of ethanol is about 506 Btu/lb. The cooling effect of the fuel is effective only with direct injection during the intake stroke while intake valve is open. The cooling effect of ethanol is significantly more than gasoline as can be seen from the heat of vaporization (HoV) values. This contributes significantly to volumetric efficiency improvement. The temperature of the aircharge after cooling can be written as the equation:

$$T{cool}=T{air}-[(1/AFR)*HoV/Cpair]$$

Then, the volumetric efficiency improvement due to cooling can be written as the equation: $[1-(Tcool/Tair)]$;

wherein Tcool is the temperature of the aircharge after charge cooling, and wherein Tair is the temperature of air before charge cooling, wherein AFR is the air-fuel ratio of the fuel, and wherein Cpair is the specific heat of air at constant pressure. Thus, the net result of cooling and partial pressure effects is a net increase in volumetric efficiency.

As discussed above, the volumetric efficiency due to cooling is a function of the charge temperature. The charge temperature that needs to be used should be a weighted average of the internal EGR temperature and the manifold charge. At low MAP conditions, due to a higher internal EGR fraction of the air, the charge temperature is higher. It thus follows that the volumetric efficiency improvement due to charge cooling would be lower. When ethanol is injected through the direct injection in the intake stroke, the cooling of the aircharge due to evaporation reduces the pressure of ethanol due to lower temperatures. There is an intercept point for the equilibrium of the vapor pressure and the in-cylinder charge temperature. The amount of fuel that can be evaporated at the vapor pressure limit is higher at lower MAP and lower at higher MAP. With internal EGR, the charge temperature is higher at lower MAP and hence has a higher vapor pressure limit. As a result, for a given aircharge temperature, the volumetric efficiency increases with the amount of direct injected fuel (e.g., E85). However, the maximum volumetric efficiency possible is lower for lower ambient temperatures. Thus, for a given aircharge temperature and manifold pressure, there is a limit on the amount of secondary direct injected fuel that can be used to increase the volumetric efficiency. In other words, there is not benefit in injecting more direct injected fuel than necessary for volumetric efficiency.

Returning to 210, the volumetric efficiency estimate may be revised based on the fuel fraction of each fuel, the fuel type (its composition, molecular weight, etc.) and the injection type used for each fuel, as discussed above. In one example, a controller may determine a volumetric efficiency correction factor based on the equations discussed above. The controller may then correct the base volumetric efficiency estimate with the correction factor. In one example, the correction factor may be a multiplier. In another example, the correction factor may be an adder. In another example, the correction may be a weighted average (based on the fuel fraction) of multiple volumetric efficiency estimates.

Thus, the adjustment to volumetric efficiency consist of two parts. The first part is the partial pressure of the evaporated fuel at IVC which displaces fresh air, thereby reducing the volumetric efficiency. The second part is the charge cooling resulting from the evaporation of the fuel prior to IVC which increases the charge density and also increases the volumetric efficiency. If gaseous fuels are used (for example, CNG), only the first effect of partial pressure takes place and it would be advantageous to inject CNG after IVC if possible (as gaseous fuel injection requires high injection pressure and good mixing).

In one example, engine volumetric efficiency may be mapped with each fuel type and/or injection system independently. Then, a weighted average may be used corresponding to the fuel fraction.

At 212, after revising the volumetric efficiency estimate, the routine includes correcting a cylinder aircharge estimate based on the revised volumetric efficiency estimate. As an example, the revised volumetric efficiency estimate may be used to adjust a manifold filling model which is then used to calculate the cylinder aircharge amount. As such, if the base volumetric efficiency estimate is not revised, the cylinder aircharge amount may be overestimated or underestimated, leading to air-fuel errors. In addition, engine torque errors may result. Further still, errors may be introduced into the positioning of all actuators that are adjusted as a function of aircharge estimate.

At 214, the routine includes adjusting an actuator in response to the revised estimate of volumetric efficiency. The adjusting may also be performed based on the revised cylinder aircharge estimate. As such, one or more actuators may be adjusted. As an example, the actuator may include one or more of an intake throttle position, a spark ignition timing, and a variable cam timing. The adjusting may include, for example, as the volumetric efficiency estimate increases, modifying spark timing for the adjusted volumetric efficiency, moving the throttle to a more closed position, decreasing the target boost pressure, adjusting intake tuning devices, and adjusting cam timing to compensate for the change in volumetric efficiency. Modifying spark timing may include retarding spark timing during some conditions and advancing spark timing during other conditions as volumetric efficiency improves. As such, increased charge cooling allows more spark advance to be tolerated under borderline conditions. As an alternate example, higher engine loads generally allow for a later spark timing.

It will be appreciated that while the above volumetric efficiency estimation is described with reference to an example where a higher ethanol content fuel is direct injected and a lower ethanol content fuel is port injected, the estimation may be similarly applied and adjusted for an example where a higher ethanol content fuel is port injected and a lower ethanol content fuel is direct injected. Further still the estimation may be used for an example where the same fuel is port injected and direct injected.

In this way, the proposed model can be used to adjust the volumetric efficiency estimate for any multi-fuel system for different combinations of fuels and injection systems. As an example, the proposed model may be applied in a dual fuel engine system, where a controller injects a first fuel into an engine cylinder via one of a port and a direct injector while injecting a second fuel into the engine cylinder via the other of the port and the direct injector. Herein, one of the first and second fuel may be gaseous fuel and the other of the first and second fuel may be a liquid fuel. For example, CNG may be port injected while gasoline is direct injected. In another example, the injected fuels may be different liquid fuels with the direct injected fuel having a higher octane rating than the port injected fuel. For example, gasoline may be port injected while E85 is direct injected. In an alternate example, gasoline may be direct injected while E85 is port injected. An engine controller may adjust an estimated engine volumetric efficiency based on a fuel fraction and a type of injection system for each fuel. The estimated engine volumetric efficiency may be further based on a timing of the direct injection (intake stroke or compression stroke) and a timing of the port injection (open intake valve or closed intake valve). The controller may then adjust an engine operating parameter based on the adjusted estimate.

As described above, adjusting based on the fuel fraction may include adjusting based on a fraction of a total fuel injection amount that is delivered as the first fuel and further based on a fraction of the total fuel injection amount that is delivered as the second fuel. Further, the adjusted may be based on the injection system of each fuel, specifically based on whether the first fuel was delivered via the port or direct injector, and further based on whether the second fuel was delivered via the port or direct injector. For example, where the first fuel is port injected and the second fuel is direct injected, the adjusting includes adjusting the estimated engine volumetric efficiency based on a partial pressure of the first fuel that is port injected and further based on a partial pressure of a portion of the second fuel that is direct injected during an intake stroke. The engine operating parameters adjusted may include one or more of spark ignition timing, valve overlap, intake valve timing, exhaust valve timing, and variable cam timing. As an example, the adjusting may include reducing an amount of spark ignition timing retard as the estimated engine volumetric efficiency increases.

In another example, an engine system comprises an engine including an engine cylinder; a first port injector configured to port inject a first fuel into the engine cylinder; a second direct injector configured to direct inject a second, different fuel into the engine cylinder; and a spark plug for initiating a spark ignition in the cylinder. The engine system may further include a controller with computer readable instructions stored on non-transitory memory for, based on engine operating conditions, port injecting a first amount of the first fuel while direct injecting a second amount of the second fuel into the engine cylinder, the second amount of direct injection including an intake stroke direct injection and a compression stroke direct injection. The controller may further adjust an engine volumetric efficiency from an initial estimate based on the engine operating conditions to a final estimate based on each of the first amount of first fuel, the second amount of second fuel, a partial pressure of the first fuel, and a partial pressure of the second fuel. The controller may then adjust an engine spark ignition timing based on the final estimate of engine volumetric efficiency. Herein the second direct injector may be configured to direct inject the second fuel as each of an intake stroke direct injection and a compression stroke direct injection. Since the compression stroke injection does not contribute significantly to the volumetric efficiency of the fuel injection, adjusting the engine volumetric efficiency based on the partial pressure of the second fuel may include adjusting based on the partial pressure of second fuel delivered as the intake stroke direct injection and not adjusting based on the partial pressure of second fuel delivered as the compression stroke direct injection.

In the above example, adjusting engine spark timing may include modifying spark timing from a first spark timing for the initial estimate, to a second spark timing for the final estimate as engine volumetric efficiency exceeds the initial estimate. In one example, the second spark timing is more advanced from the first spark timing. In another example, the second spark timing is more retarded from the first spark timing. The controller may include further instructions for moving an intake throttle towards a more closed position as the final estimate of engine volumetric efficiency exceeds the initial estimate.

Turning now to FIG. 3, example actuator adjustments based on updated volumetric efficiency estimates is shown as fueling in a dual-fuel engine system changes. Map 300 depicts direct injection of a first fuel (herein E85) at plot 302, port injection of a second fuel (herein gasoline) at plot 304, change in volumetric efficiency ($\Delta$Vol_eff) due to the change in fueling at plot 306, manifold pressure (MAP) at plot 308, changes to a throttle position at plot 310, and changes to spark timing relative to a borderline spark (BDL) at plot 312. All parameters are plotted against time along the x-axis.

Prior to t1, the engine may be operating with a high fraction of port injected gasoline fuel and a smaller fraction of direct injected ethanol fuel (E85). In addition, the engine may be operating with an amount of spark retard.

At t1, due to a change in engine operating conditions, direct injection of E85 is increased while port injection of gasoline is correspondingly decreased to maintain engine torque. Due to the increased direct injection of ethanol fuel, a charge cooling effect may predominate resulting in an increase in volumetric efficiency. To maintain the air received in the engine at the higher volumetric efficiency condition, MAP is decreased by slightly closing the intake throttle. In addition, the increased charge cooling causes borderline spark to move to a relatively more advanced position as compared to before t1. Thus, at t1, spark timing is adjusted. Herein, spark timing is advanced relative to the timing used before t1 and held at the new borderline spark timing (BDL). The significant advance in borderline spark is due to the combined effect of charge cooling and the high RON rating of E85 fuel relative to gasoline fuel.

At t2, due to a further change in engine operating conditions, direct injection of E85 is decreased while port injection of gasoline is correspondingly increased to maintain engine torque. Due to the increased port injection of gasoline fuel, a partial pressure effect may predominate resulting in a decrease in volumetric efficiency. To maintain the air received in the engine at the lower volumetric efficiency condition, MAP is increased by slightly opening the intake throttle. In addition, the decreased charge cooling causes borderline spark to move to a relatively more retarded position as compared to before t2. Thus, at t2, spark timing is adjusted. Herein, spark timing is retarded relative to the timing used before t2 and held at the new borderline spark timing (BDL).

In this way, a more accurate volumetric efficiency estimate may be calculated based on the aggregated effect of charge cooling and partial pressure of differing fuel types and fuel injection types. By learning the charge cooling effect from each of direct injection of a fuel as well as the use of an alcohol fuel, a net increase in volumetric efficiency from the charge cooling can be better determined. At the same time, the partial pressure effect from a port injection of fuel can be used to determine a net decrease in volumetric efficiency. The aggregate effect is used to correct an initial volumetric efficiency estimate based on engine speed-load conditions. By estimating volumetric efficiency more accurately, cylinder aircharge estimation errors can be reduced, improving engine air control. By adjusting engine actuators in accordance, torque disturbances from air flow errors can be reduced. Overall, engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
adjusting an estimate of engine volumetric efficiency in response to a partial pressure of a first fuel direct injected into a cylinder during a cylinder cycle and a partial pressure of a second fuel port injected into the cylinder during the cylinder cycle, and further based on a heat of vaporization of the first fuel and whether the first and second fuels were injected while an intake valve of the cylinder was open or closed, wherein the partial pressures of the first and second fuels are estimated based on molecular weights and stoichiometric air-fuel ratios of the first and second fuels, respectively, and wherein the first fuel and second fuel are different types of fuel; and
adjusting an engine actuator in response to the estimate of engine volumetric efficiency.

2. The method of claim 1, wherein adjusting the estimate of engine volumetric efficiency in response to the partial pressure of the first fuel direct injected into the cylinder during the cylinder cycle includes adjusting the estimate of engine volumetric efficiency based on a partial pressure of a fuel fraction direct injected during intake valve opening.

3. The method of claim 1, wherein one of the first and second fuels is a gaseous fuel, and wherein the other of the first and second fuels is a liquid fuel.

4. The method of claim 1, wherein the actuator includes one of an intake throttle, a variable cam timing, a spark ignition timing, an intake tuning device, a turbocharger wastegate, and a charge motion control device.

5. A method, comprising:
injecting a first fuel into an engine cylinder via one of a port and a direct injector while injecting a second fuel into the engine cylinder via the other of the port and the direct injector, wherein the second fuel has a higher heat of vaporization than the first fuel, and wherein the second fuel comprises one or more of a lower molecular weight than the first fuel and a lower stoichiometric air-fuel ratio than the first fuel;
adjusting an estimated engine volumetric efficiency based on a fraction of a total fuel injection amount that is delivered as the first fuel, based on a fraction of the total fuel injection amount that is delivered as the second fuel, based on whether the first fuel was delivered via the port or direct injector, and based on whether the second fuel was delivered via the port or direct injector, wherein for a given fuel, the estimated engine volumetric efficiency is greater when that fuel is direct injected than when it is port injected, wherein for the port injector, the estimated engine volumetric efficiency is greater when the port injector injects the first fuel than when the port injector injects the second fuel, and wherein for the direct injector, the estimated engine volumetric efficiency is determined based on a partial pressure of the fuel injected by the direct injector, which is greater when the direct injector injects the second fuel than when the direct injector injects the first fuel, and the heat of vaporization of the fuel, wherein for the direct injector, the estimated engine volumetric efficiency decreases for increases in the partial pressure of the fuel injected by the direct injector and increases for increases in the heat of vaporization of the fuel injected by the direct injector; and adjusting an engine operating parameter based on the adjusted estimate.

6. The method of claim 5, wherein the first fuel is port injected and the second fuel is direct injected, and wherein the method further includes adjusting the estimated engine volumetric efficiency based on a partial pressure of the first fuel that is port injected and further based on a partial pressure of a portion of the second fuel that is direct injected during an intake stroke.

7. The method of claim 6, wherein each of the first and second fuels are liquids fuels, and wherein the second fuel has a higher octane rating than the first fuel.

8. The method of claim 6, wherein the first fuel is a liquid fuel including gasoline, and wherein the second fuel is a gaseous fuel including CNG.

9. The method of claim 5, wherein the engine operating parameter includes one or more of spark ignition timing, valve overlap, intake valve timing, exhaust valve timing, and variable cam timing.

10. The method of claim 9, wherein the adjusting includes reducing an amount of spark ignition timing retard as the estimated engine volumetric efficiency increases.

11. An engine system, comprising:
an engine including an engine cylinder;
a first fuel system comprising a fuel pump and a fuel tank storing a first fuel;
a second, high pressure fuel system comprising fuel pumps and a fuel tank storing a second, different fuel;
a first port injector configured to port inject the first fuel into an intake port of the engine cylinder;
a second direct injector configured to direct inject the second fuel into the engine cylinder;
a spark plug for initiating a spark ignition in the cylinder; and
a controller with computer readable instructions stored on non-transitory memory for:
based on engine operating conditions, port injecting a first amount of the first fuel while direct injecting a second amount of the second fuel into the engine cylinder, the second amount of the second fuel including an intake stroke direct injection and a compression stroke direct injection;
adjusting an engine volumetric efficiency from an initial estimate based on the engine operating conditions to a final estimate based on each of the first amount of the first fuel, the second amount of the second fuel, a partial pressure of the first fuel in the intake port, a partial pressure of the second fuel in the engine cylinder, a latent heat of vaporization of the second fuel, and whether the first and second fuels were injected while an intake valve of the cylinder was open or closed, wherein the partial pressures of the first and second fuels are estimated based on molecular weights and stoichiometric air-fuel ratios of the first and second fuels, respectively; and
adjusting an engine spark ignition timing based on the final estimate of engine volumetric efficiency.

12. The system of claim 11, wherein the second direct injector is configured to direct inject the second fuel as each of an intake stroke direct injection and a compression stroke injection, and wherein adjusting the engine volumetric efficiency based on the partial pressure of the second fuel includes adjusting based on a partial pressure of the second fuel delivered as the intake stroke direct injection and not adjusting based on a partial pressure of the second fuel delivered as the compression stroke direct injection.

13. The system of claim 12, wherein adjusting engine spark ignition timing includes advancing spark timing from a first spark timing for the initial estimate, to a second spark timing for the final estimate as engine volumetric efficiency exceeds the initial estimate.

14. The system of claim 13, wherein the controller includes further instructions for moving an intake throttle towards a more closed position as the final estimate of engine volumetric efficiency exceeds the initial estimate.

15. The method of claim 1, wherein the first fuel is direct injected into the cylinder via a direct injector coupled to a first fuel system comprising fuel pumps and a fuel tank storing the first fuel, wherein the first fuel system is a high pressure fuel system, and wherein the second fuel is port injected into the cylinder via a port injector coupled to a second fuel system comprising a fuel pump and a fuel tank storing the second fuel.

16. The method of claim 1, wherein adjusting the estimate of engine volumetric efficiency further comprises reducing the estimate of engine volumetric efficiency less when the second fuel is port injected during an intake stroke as compared to a reduction in the estimate of engine volumetric efficiency when the second fuel is port injected during an exhaust stroke.

17. The method of claim 1, wherein adjusting the estimate of engine volumetric efficiency further comprises reducing the estimate of engine volumetric efficiency as an amount of the second fuel port injected increases and increasing the estimate of engine volumetric efficiency as an amount of the first fuel direct injected increases.

18. The method of claim 5, wherein adjusting the estimated engine volumetric efficiency based on the fraction of the total fuel injection amount that is delivered as the first fuel and the fraction of the total fuel injection amount that is delivered as the second fuel comprises reducing the estimated engine volumetric efficiency as the fraction of the total fuel injection amount that is delivered as the first fuel increases and increasing the estimate of volumetric efficiency as the fraction of the total fuel injection amount that is delivered as the second fuel increases.

19. The method of claim 6, wherein the port injector is coupled to a first fuel system comprising a fuel pump and a fuel tank storing the first fuel, wherein the direct injector is coupled to a second fuel system comprising fuel pumps and a fuel tank storing the second fuel, and wherein the second fuel system is a high pressure fuel system.

* * * * *